(12) United States Patent
Yamazaki et al.

(10) Patent No.: US 7,128,110 B2
(45) Date of Patent: Oct. 31, 2006

(54) AGRICULTURAL WHEEL TIRE

(75) Inventors: Nobuo Yamazaki, Wako (JP); Keiji Iino, Wako (JP)

(73) Assignee: Honda Motor Co., Ltd. (JP)

( * ) Notice: Subject to any disclaimer, the term of this patent is extended or adjusted under 35 U.S.C. 154(b) by 174 days.

(21) Appl. No.: 10/761,955

(22) Filed: Jan. 21, 2004

(65) Prior Publication Data
US 2004/0149365 A1 Aug. 5, 2004

(30) Foreign Application Priority Data
Jan. 22, 2003 (JP) .............................. 2003-013761

(51) Int. Cl.
*B60C 11/01* (2006.01)
*B60C 11/03* (2006.01)
(52) U.S. Cl. ..................... 152/209.12; 152/209.16; 152/324
(58) Field of Classification Search ............ 152/209.1, 152/209.12, 209.13, 209.16, 324, 523; D12/569–599
See application file for complete search history.

(56) References Cited

U.S. PATENT DOCUMENTS

D61,033 S * 6/1922 Dahl .......................... D12/569
4,957,149 A * 9/1990 Iuchi ...................... 152/209.16

FOREIGN PATENT DOCUMENTS

| JP | 58-152605 | * | 9/1983 |
| JP | 6057487 | | 8/1994 |
| JP | 7030401 | | 7/1995 |
| JP | 8-156502 | * | 6/1996 |
| JP | 9-28133 | * | 2/1997 |

* cited by examiner

Primary Examiner—Steven D. Maki
(74) Attorney, Agent, or Firm—Adams & Wilks

(57) ABSTRACT

An agricultural wheel tire has a tire tread having first and second lateral edges defining the width of the tire tread, and two sets of lugs. Each lug of the first set extends from a center of the tread width and terminates at the first lateral edge of the tire tread. Each lug of the second set extends from the center of the tread width and terminates at the second lateral edge of the tire tread. The first and second sets of lugs extend in an alternating manner in a circumferential direction of the tire tread so that corresponding side and end surfaces of adjacent first and second lugs and corresponding surfaces of the tire tread form substantially spherical-shaped depressed portions of the tire tread. The spherical-shaped depressed portions are arranged in the circumferential direction of the tire tread so that when the wheel tire is driven on soft soil, the spherical-shaped depressed portions engage and are buried in the soft soil and the soft soil is gathered inward of the spherical-shaped depressed portions and gradually hardened so that soft soil located between and surrounding the adjacent first and second lugs increases in hardness to thereby prevent the wheel tire from sinking into the soft soil so that the wheel tire has sufficient driving force.

9 Claims, 9 Drawing Sheets

AGRICULTURAL WHEEL TIRE

BACKGROUND OF THE INVENTION

1. Field of the Invention

The present invention relates to tires for use on wheels of farm working machines and, more particularly, to a tire having a tread integrally formed with a plurality of lugs.

2. Background Information

A tire for farm working machines, which generally need a great tractive force, has a tread formed with a plurality of lugs. Japanese Patent Laid-Open Publication No. HEI-6-57487, for example, presents a farm working machine wheel having a plurality of lugs formed obliquely on the tread. Japanese Utility Model Laid-Open Publication No. HEI-7-30401 presents a farm working machine wheel with a plurality of lugs protruded outward from lateral edges of a tire.

FIGS. 10A and 10B hereof illustrate the wheel disclosed in HEI-6-57487.

A farm working machine wheel 200 shown in FIGS. 10A and 10B consists of a tire 201 and a rim 206 supporting the tire 201. The tire 201 has a tread 205 on which long lugs 202 and short lugs 203 are circumferentially disposed in an alternating manner, slanting at a predetermined angle θ with respect to the wheel rotation axis.

The tread 205 of the tire 201 has a convexly curved shape as shown in FIG. 10B. The long lugs 202 and the short lugs 203 slant with respect to the wheel rotation axis line. When the farm working machine wheel 200 travels on farm land having a soft upper layer, the soft soil is likely to be expelled in arrow directions. The wheel 200 thus sinks down, reaching hard soil in a lower layer, and obtaining a driving force. If the sinking amount of the wheel 200 is large, a lower body portion of the farm working machine mounted with the wheel 200 contacts the ground, having difficulty in smooth traveling.

FIGS. 11A and 11B hereof illustrate the wheel disclosed in HEI-7-30401.

A farm working machine wheel 210 shown in FIGS. 101A and 11B has a plurality of lugs 213 formed on a tubular portion 212 of a tire 211. Each of the lugs 213 consists of a circumferential lug 214 extending circumferentially about the tire 211 and an axial lug 215 extending from the circumferential lug 214 in parallel with the rotation axis of the tire 211. Specifically, the axial lug 215 protrudes outward from a lateral edge of the tubular portion 212. Reference numeral 217 denotes a core material of the tire 211.

The tubular portion 212 of the tire 211 of the farm working machine wheel 210 has a small width, causing the wheel 210 to be likely to sink in the soil. The farm working machine has difficulty in smooth traveling, as described with FIGS. 10A and 10B.

It is thus desired to improve a farm working machine wheel to prevent sinking of the wheel and to improve the traveling performance of the farm working machine on soft land or cultivated land.

SUMMARY OF THE INVENTION

According to the present invention, there is provided an agricultural wheel tire having a tread integrally formed with a plurality of lugs, the lugs comprising: a plurality of first lugs extending from a center of a tire width to a first lateral edge of the tire; and a plurality of second lugs extending from the center of the tire width to a second lateral edge of the tire; the first lugs and the second lugs being circumferentially formed in an alternating manner; wherein side surfaces of adjacent first lugs, an end surface of a second lug located at the center between the first lugs, and a bottom surface located between the first lugs form a depressed portion in a substantially spherical shape; and side surfaces of adjacent second lugs, an end surface of a first lug located at the center between the second lugs, and a bottom surface located between the second lugs form a depressed portion in a substantially spherical shape.

When the agricultural wheel travels on a cultivated field or soft land, the substantially spherical depressed portions can gather and harden the soil, transmitting a sufficient driving force of the tire to the cultivated field or soft land, and preventing the tire from sinking in the soil.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

In the present embodiment, a walk-behind tiller 10 (hereinafter referred to only as a tiller 10) is illustrated as a walk-behind farm working machine provided with agricultural wheels.

Figure 1:
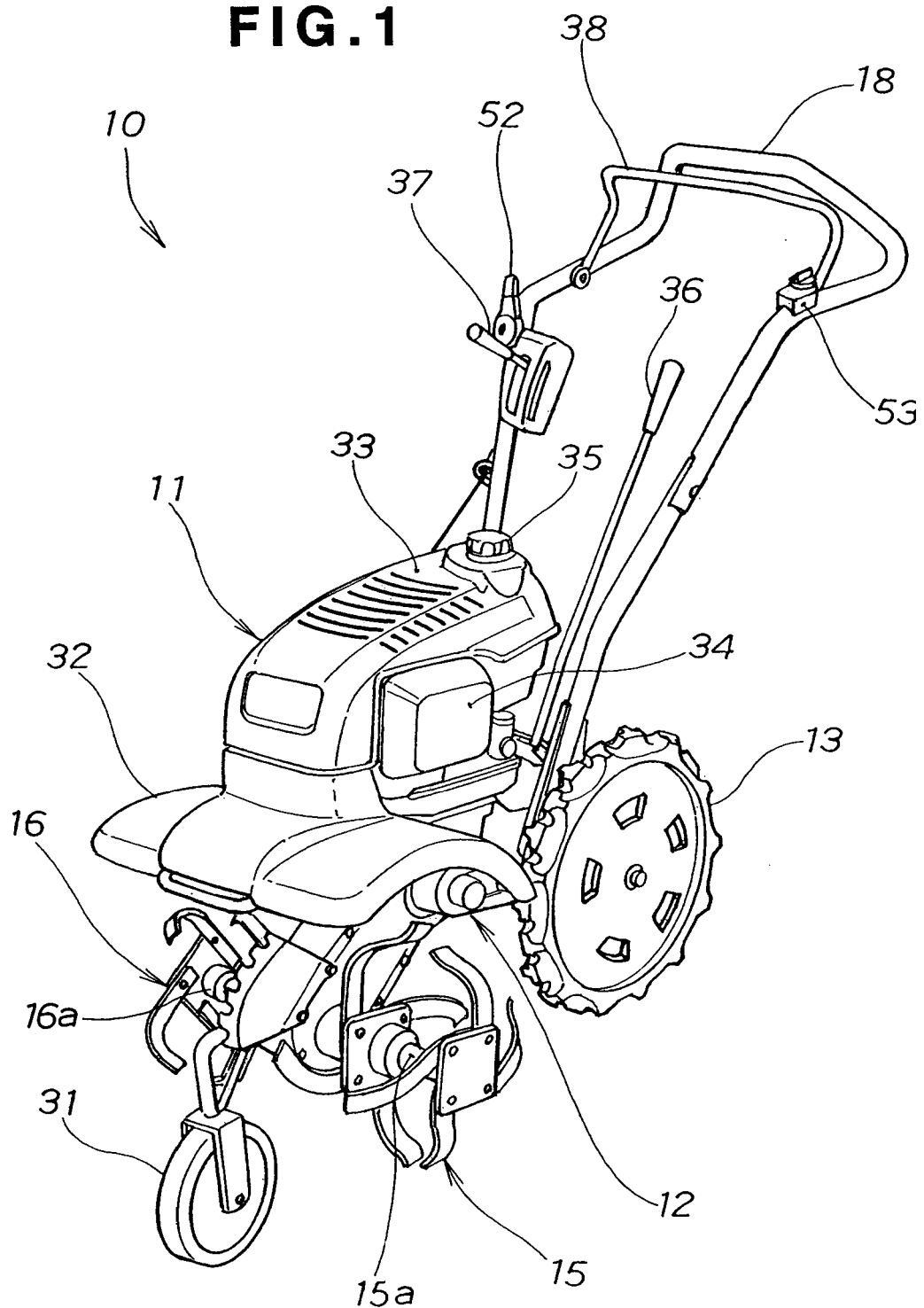
FIG. 1 is a perspective view of a walk-behind tiller with tires according to the present invention.

The tiller 10 shown in FIG. 1 transmits the power of an engine 11 to left and right drive wheels 13, 14 (only front reference numeral 13 shown) and left and right tilling devices 15, 16 disposed forward of the drive wheels 13, 14 via a power transmission device 12. A working device such as a ridger is connected to the rear of the power transmission device 12. While the tilling devices 15, 16 till a farm field, a ridger 22 (see FIGS. 2 and 3), for example, forms ridges.

Figure 2:
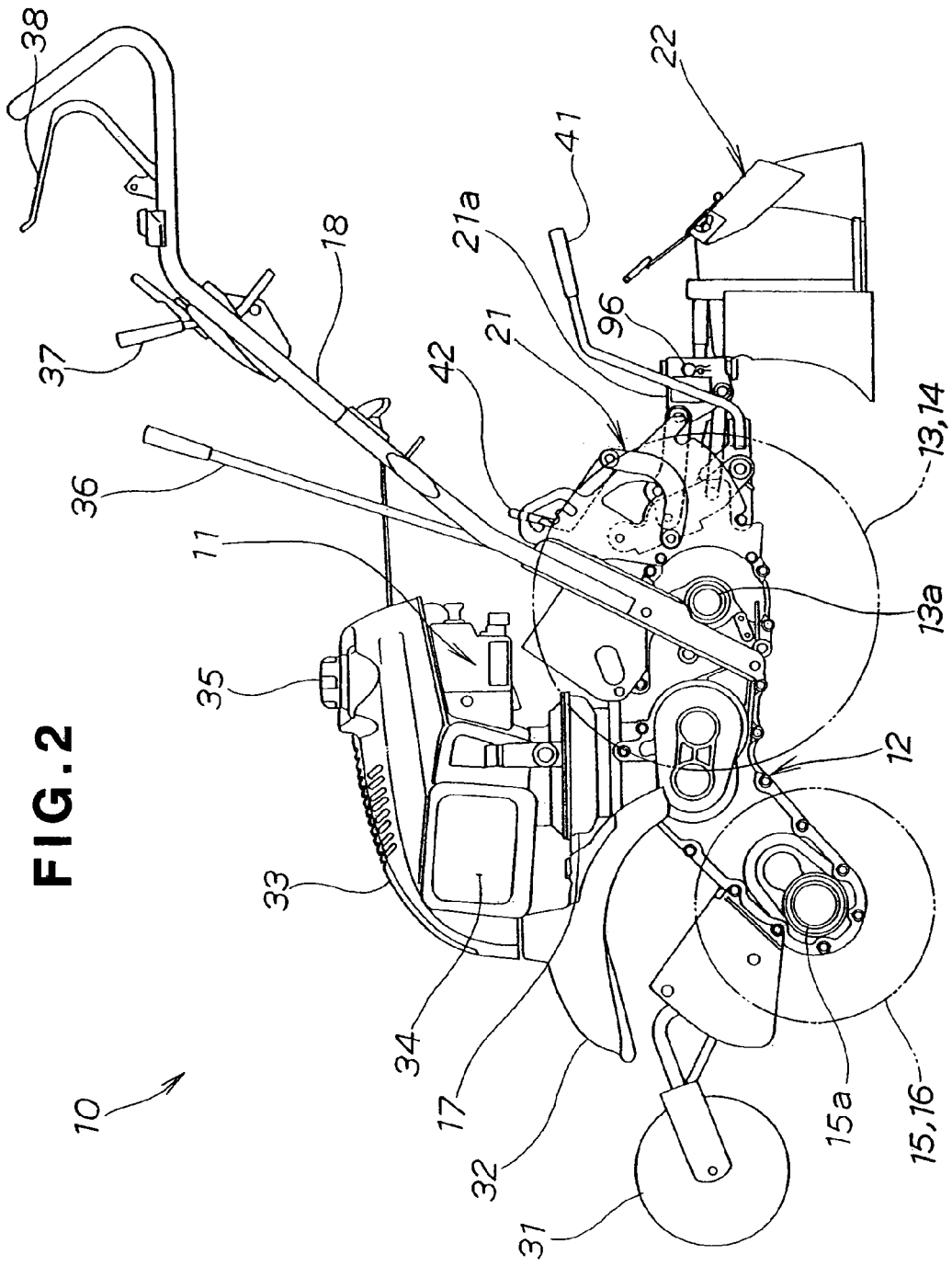
FIG. 2 is a side view of the tiller shown in FIG. 1.
Figure 3:
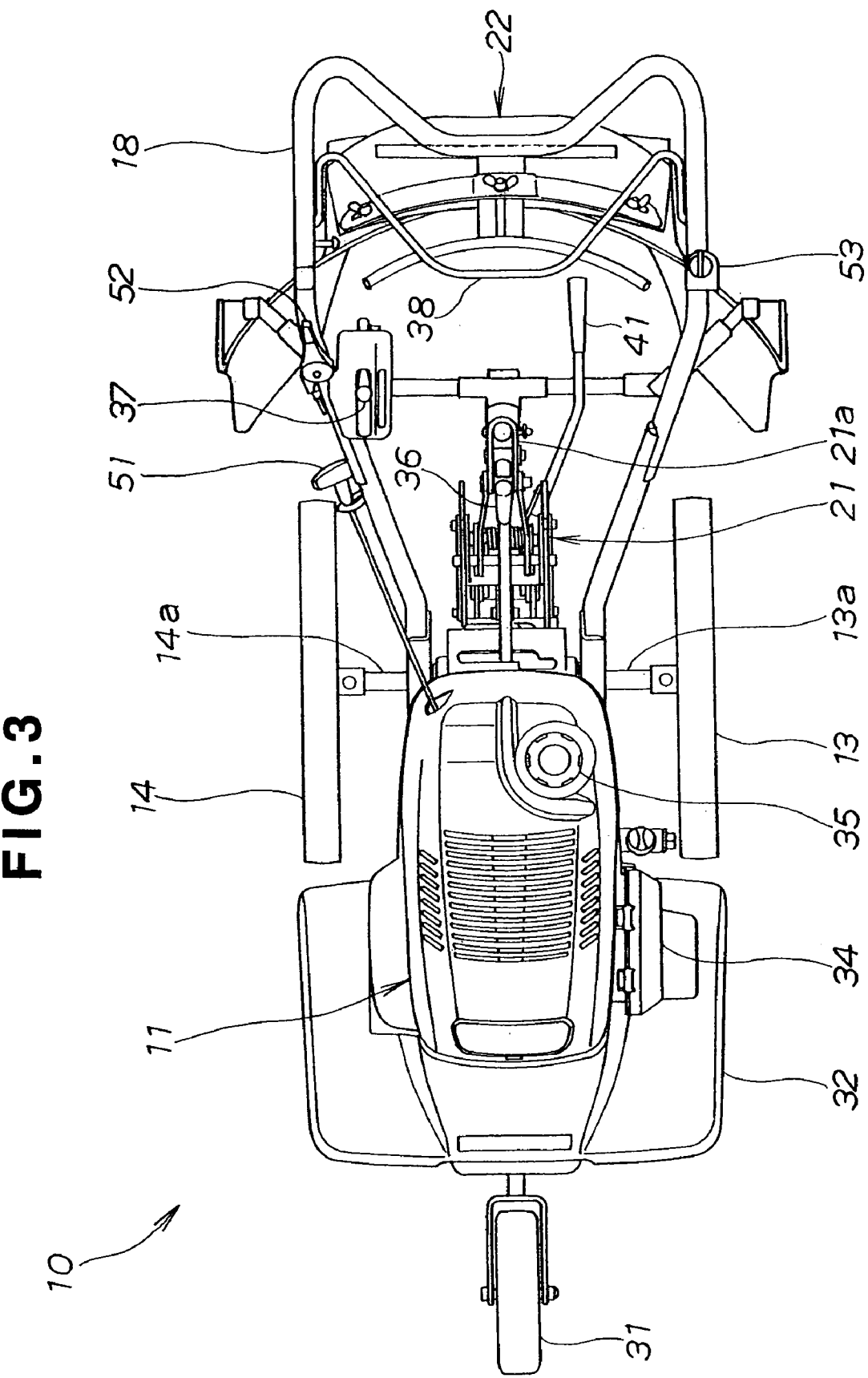
FIG. 3 is a plan view of the tiller shown in FIG. 1.

As shown in FIGS. 2 and 3, the tiller 10 includes the engine 11 disposed on top of the body, the power transmission device 12 mounted via a clutch (not shown) contained in a clutch case 17 which is provided below the engine 11, the tilling devices 15, 16 (see FIG. 1) rotatably mounted via left and right tilling shafts 15a, 16a (see FIG. 1 for the right tilling shaft 16a) to the front of the power transmission device 12, the drive wheels 13, 14 rotatably mounted via a left axle 13a and a right axle 14a to the rear of the power transmission device 12, a handle 18 extended obliquely from the rear of the power transmission device 12 in a rearward and upward direction, and a coupling mechanism 21 mounted to the rear end of the power transmission device 12. The ridger 22 as a working device is connected to the coupling device 21.

An auxiliary wheel 31 is mounted to a front end portion of the power transmission device 12 in a vertically adjustable manner. A fender 32 covers the power transmission device 12 and the tilling devices 15, 16 from above. An engine cover 33 covers the engine 11 from above.

Reference numeral 34 denotes an air cleaner, and 35 a fuel tank filler cap. Reference numeral 36 denotes a shift lever, and 37 a differential gear lock lever. Reference numeral 38 denotes a clutch lever, and 41 a lifting lever for lifting a working device connected to the coupling mechanism 21. A sinking position adjusting lever 42 adjusts the sinking amount of the working device connected to the coupling mechanism 21.

As shown in FIG. 3, at a right front portion of the handle 18, a recoil starter knob 51 for starting the engine 11, a throttle lever 52 for adjusting the output of the engine 11, and the differential gear lock lever 37 are disposed. An engine switch 53 for stopping the engine 11 is mounted on a left rear portion of the handle 18. The clutch lever 38 is mounted at a rear portion of the handle 18. The shift lever 36 is extended rearward from a rear middle portion of the power transmission device 12 (see FIG. 1). The lifting lever 41 is extended rearward from a rear left portion of the coupling mechanism 21.

Now, the configuration of a tire according to the present invention provided on the drive wheel 13 will be described with reference to FIGS. 4 to 7. The drive wheel 14 has the same configuration as that of the drive wheel 13 and will not be described.

Figure 4:
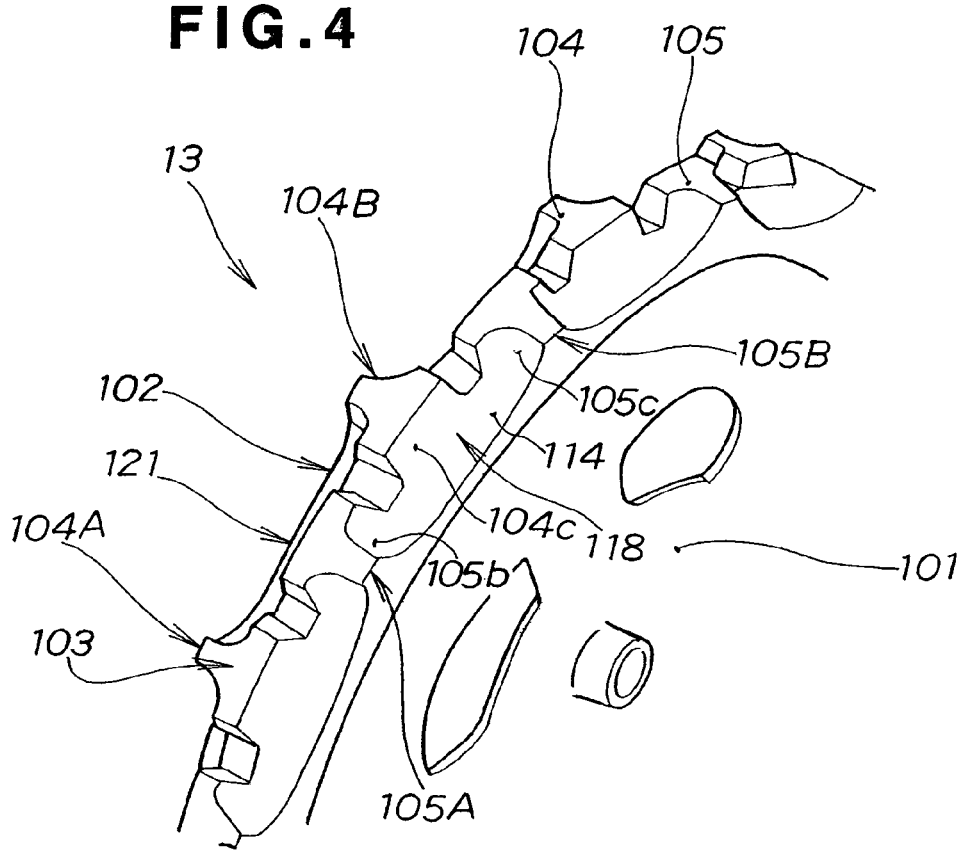
FIG. 4 is a partial perspective view of a tire provided on a drive wheel according to the present invention.

Referring to FIG. 4, the drive wheel 13 includes a disc-shaped wheel 101 mounted on the left axle 13a (see FIG. 3) and a tire 102 mounted on the periphery of the wheel 101.

The tire 102 has on its outside peripheral surface a tread 103 on which a plurality of first lugs 104 and a plurality of second lugs 105 are formed circumferentially in an alternating manner for avoiding sinking when traveling on a cultivated field or soft land. The first lugs 104 and second lugs 105 are herein referred to as first lugs 104A, 104B and second lugs 105A, 105B for convenience of explanation.

Figure 5:
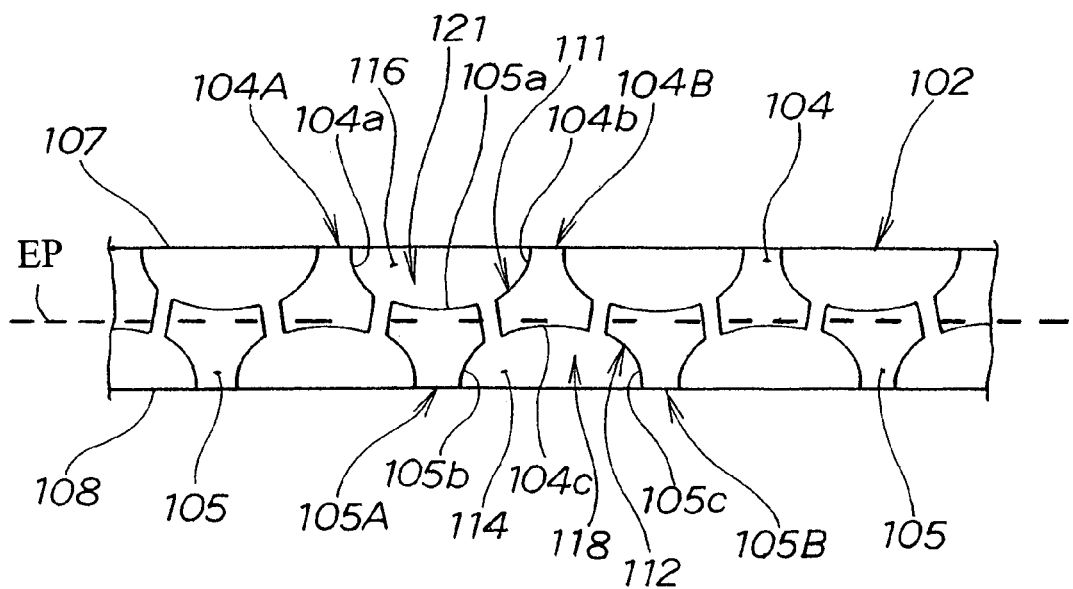
FIG. 5 is a plan view of the tire shown in FIG. 4.

As shown in FIG. 5, the first lugs 104 extend from a center of width of the tire 102 to a first lateral edge 107 of the tire 102, gradually narrowing in width. The second lugs 105 extend from the center of width of the tire 102 to a second lateral edge 108 of the tire 102, gradually narrowing in width. The first lugs 104 and the second lugs 105 point in opposite lateral directions. The tire 102 has an equatorial center plane EP crossing each of the first and second lugs 104, 105 in a circumferential direction of the tire 102.

Similarly, a contour 112 formed by a side surface 105b of the second lug 105A, a central end surface 104c of the first lug 104B, and a side surface 105c of the adjacent second lug 105B is substantially in an arc shape.

Figure 6:
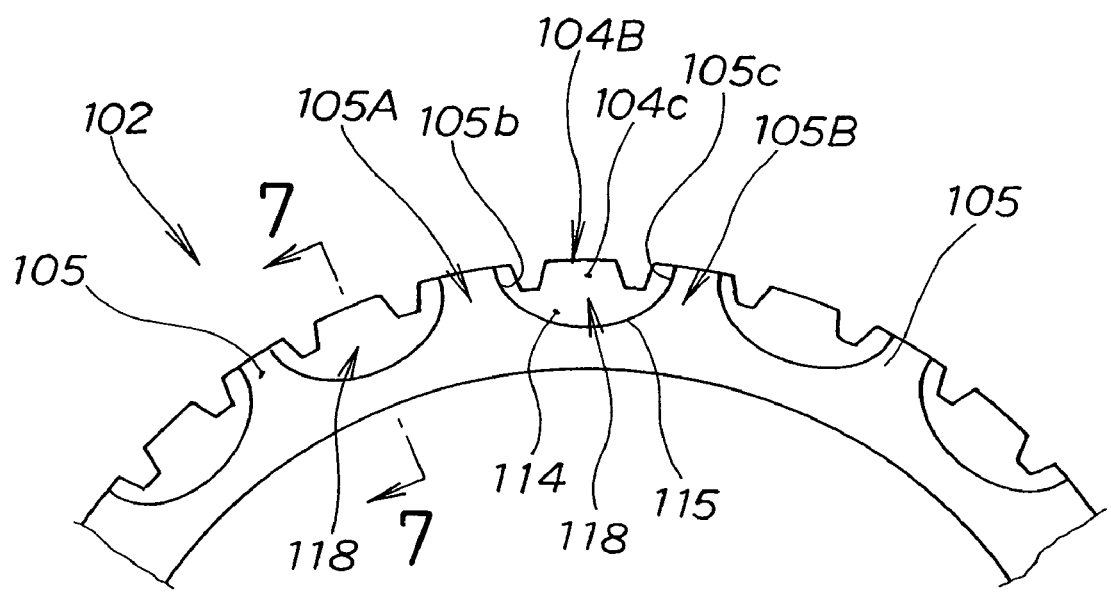
FIG. 6 is a side view of the tire shown in FIG. 4.

As shown in FIG. 6, in a side view of the tire 102, a contour 115 formed by the side surface 105b of the second lug 105A, a bottom surface 114 between the second lugs 105A and 105B and the side surface 105c of the second lug 105B is also substantially in an arc shape. A contour between the first lugs 104A and 104B (see FIG. 5) in a side view is also substantially in an arc shape.

That is, as shown in FIG. 4, a depressed portion 118 formed by the side surface 105b of the second lug 105A, the central end surface 104c of the first lug 104B, the side surface 105c of the second lug 105B and the bottom surface 114 located between the second lugs 105A and 105B is formed in a substantially spherical shape. A depressed portion 121 between the first lugs 104A and 104B is also formed in a substantially spherical shape.

Figure 7:
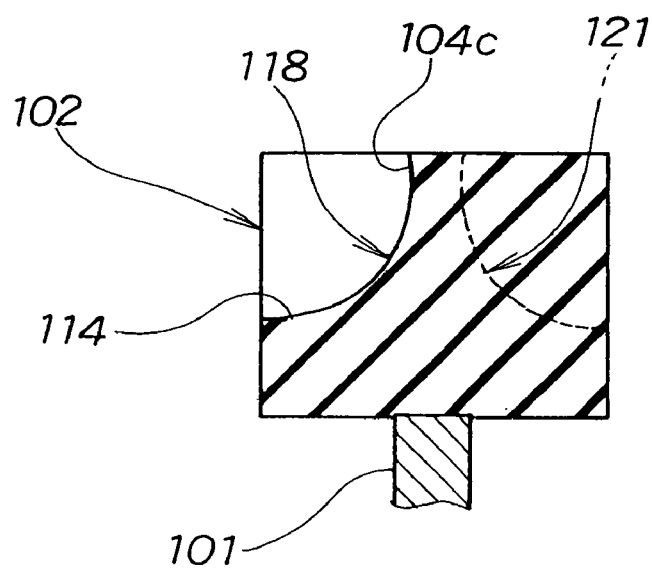
FIG. 7 is a cross-sectional view taken along line 7—7 in FIG. 6.

As shown in FIG. 7, the tire 102 of a rectangular contour has the depressed portions 118, 121 formed in a substantially spherical shape. The cross-sectional shape of the depressed portions 118, 121 is substantially a quarter sector of a circle. Each of the depressed portions 118 and 121 is symmetrical about a line extending through a longitudinal center thereof and crossing the equatorial center plane EP.

Now, the function of the tire 102 will be described with reference to FIGS. 8A, 8B, 8C, 9A and 9B.

Figure 8A:
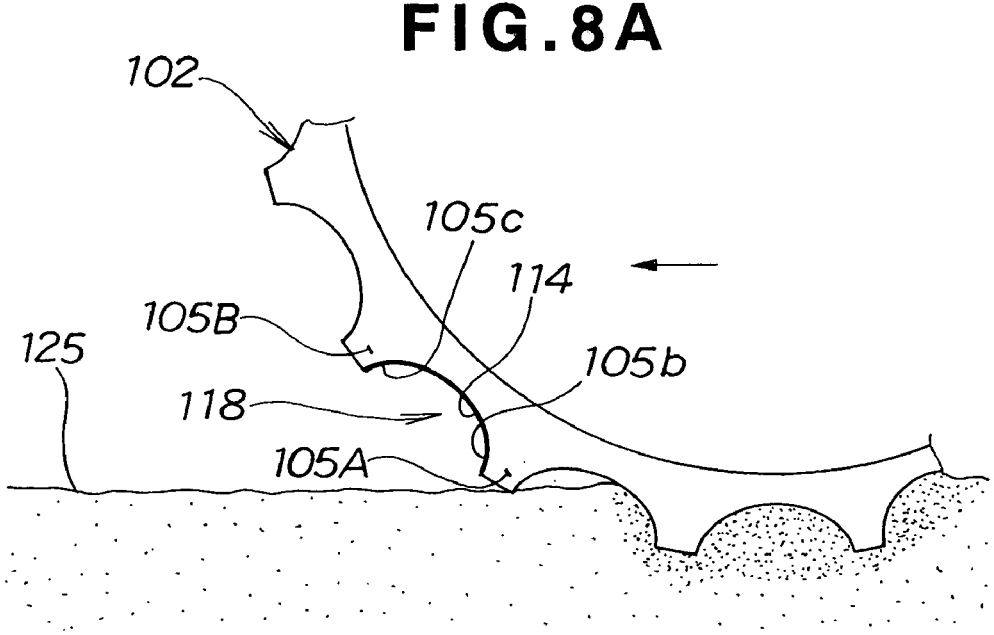
FIGS. 8A, 8B and 8C are diagrams illustrating the traveling of the tire according to the present invention on soft land.

FIG. 8A illustrates the tire 102 traveling on a cultivated field 125 (or soft land). The depressed portion 118 is about to engage the cultivated field 125.

Now, the function of the depressed portions 118 will be described sequentially with regard to a given depressed portion 118.

Figure 8B:
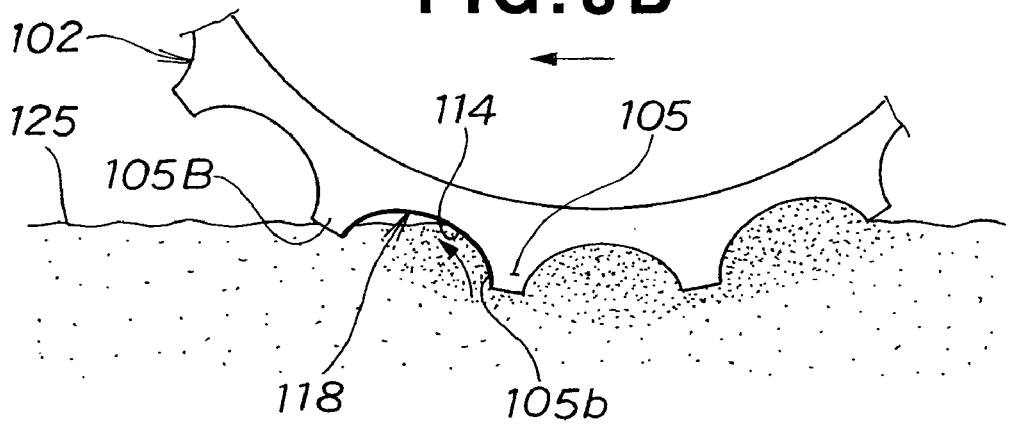

Referring to FIG. 8B, part of the depressed portion 118, that is, the side surface 105b of the second lug 105A and the bottom surface 114 start engaging the cultivated field 125. The soil in the vicinity of the side surface 105b of the second lug 105A is gathered along the side surface 105b of a substantially spherical shape as shown by an arrow and is gradually hardened.

Figure 8C:
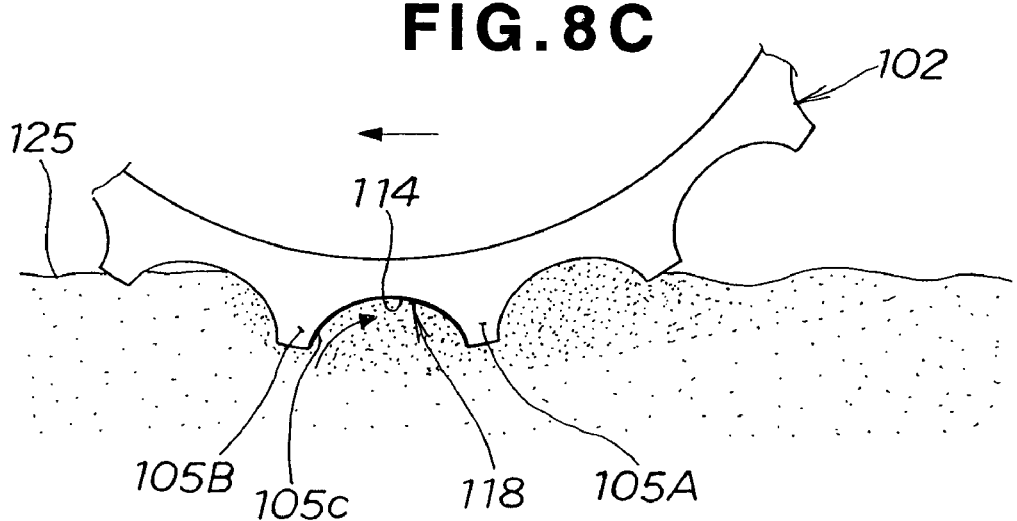

Referring to FIG. 8C, when the spherical depressed portion 118 in its entirety is buried in the cultivated field 125, the soil is gathered along the substantially-spherical side surface 105c of the second lug 105B as shown by an arrow and is gradually hardened. The soil located between and surrounding the second lugs 104A and 105B has increased hardness, preventing the tire 102 from sinking. The soil of increased hardness allows the tire 102 to have a sufficient driving force.

Figure 9A:
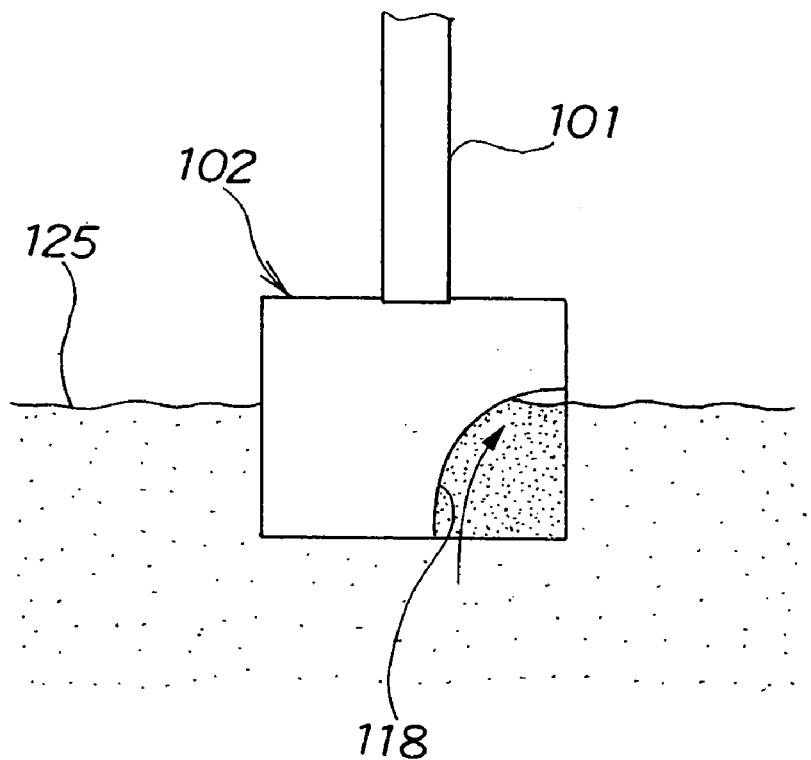
FIGS. 9A and 9B are diagrams illustrating the conditions of the soil when the tire according to the present invention travels on the soft land.
Figure 9B:
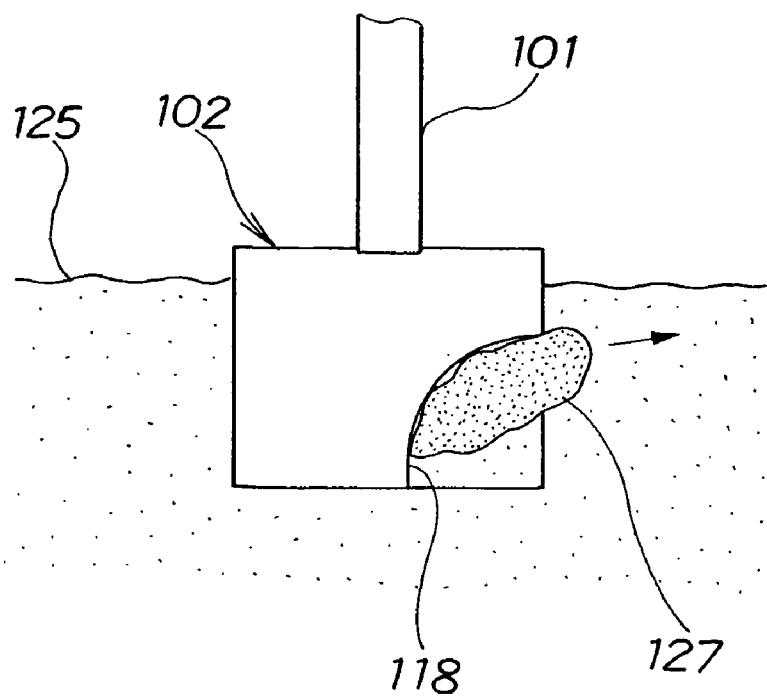
Figure 10A:
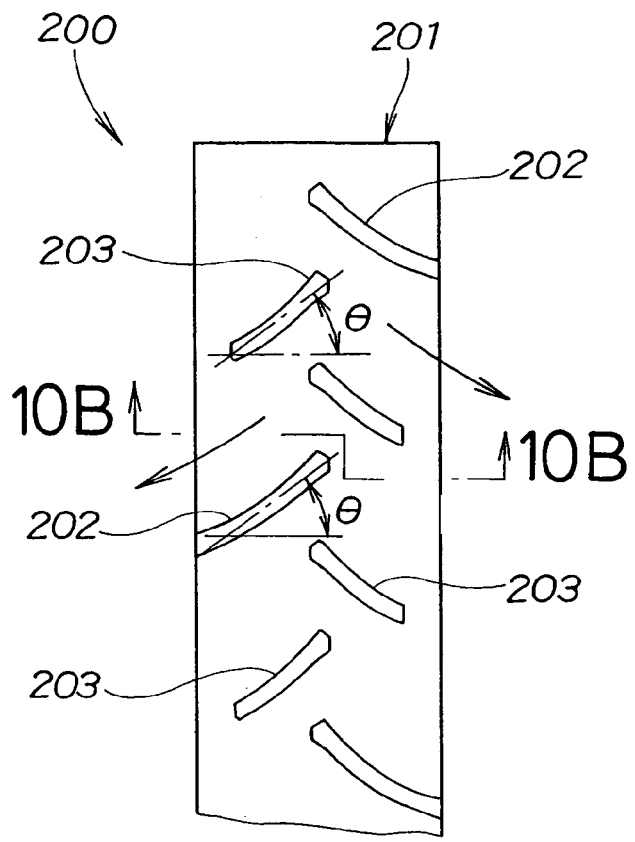
FIG. 10A is a plan view of a conventional agricultural wheel provided with long lugs and short lugs slanting at a predetermined angle with respect to the wheel rotation axis, provided alternately in the circumferential direction of the tire.
Figure 10B:
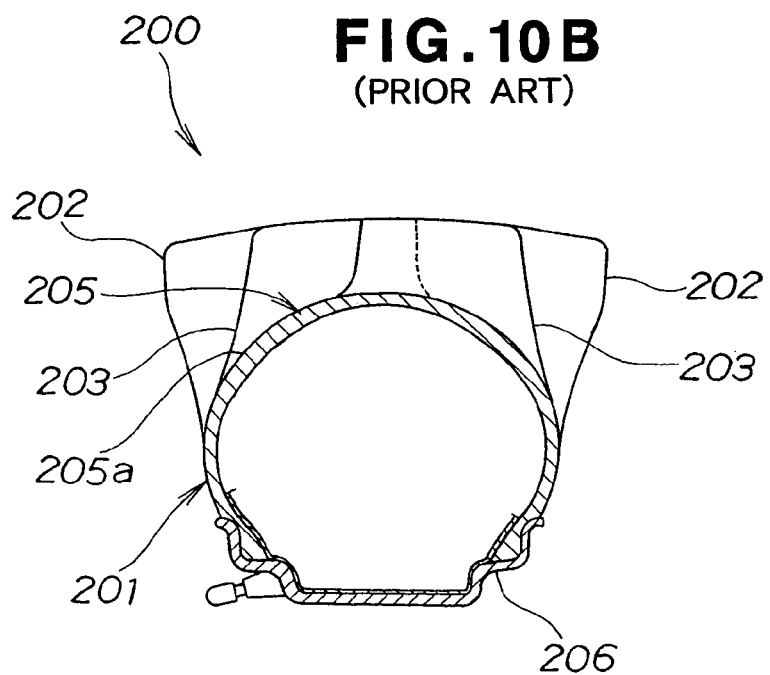
FIG. 10B is a cross-sectional view taken along line 10B—10B in FIG. 10A.
Figure 11A:
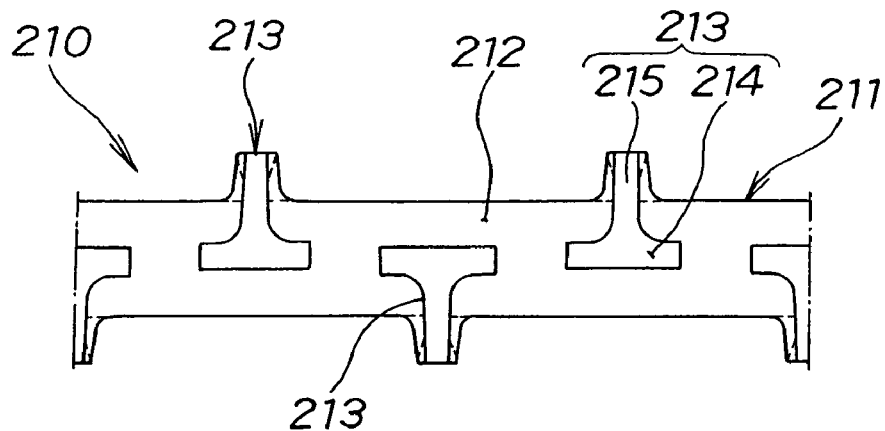
FIGS. 11A and 11B are diagrams illustrating a conventional agricultural wheel with lugs having circumferentially-extending lug portions and lug portions extending in the direction of rotation axis of a tire and protruding from lateral edges of the tire, which lugs are disposed alternately to point in opposite directions from the center of the width of the tire.
Figure 11B:
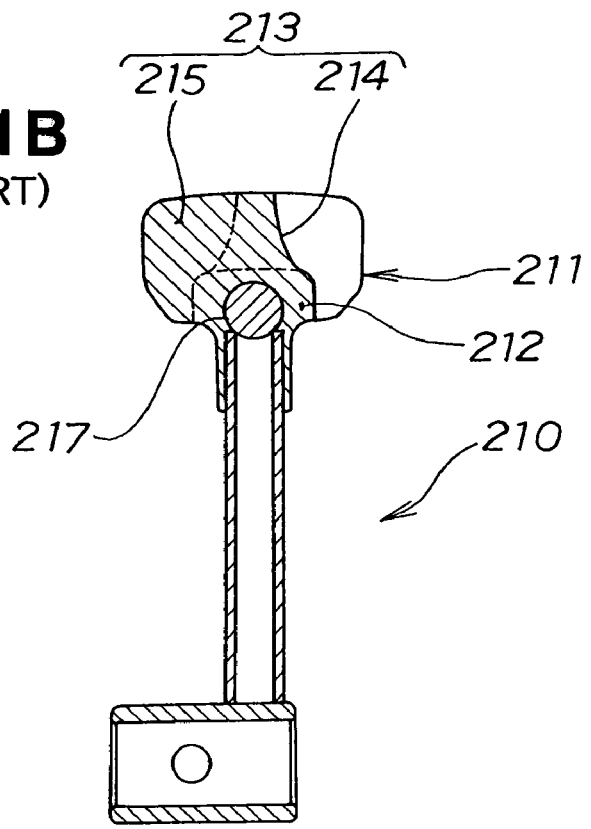

As shown in FIG. 9A, during travel on the cultivated field 125, the soil is gathered inward of the depressed portion 118 and gradually hardened. Then, as shown in FIG. 9B, the soil within the depressed portion 118 becomes a solid 127 and is expelled outward from within the depressed portion 118. The depressed portion 118 can thus again rake up the soil inward for hardening it.

As described above, the depressed portion 118 having a substantially spherical shape can smoothly expel the soil gathered and hardened in the depressed portion 118 outside of the depressed portion 118, hardly getting clogged up with the soil and constantly maintaining the transmission of driving force of the agricultural tire 102 in good condition.

As described above, according to the present invention, during travel on the cultivated field 125 or soft land, the drive wheels 13, 14 can gather and harden the soil with the spherical depressed portions 118, 121, transmitting a sufficient driving force of the tires 120 to the cultivated field 125 or soft land, and avoiding the sinking of the tires 102 into the soil. The tiller 10 (see FIG. 2) mounted with the drive wheels 13, 14 can be prevented from contacting the cultivated field 125 or soft land at the undersurface of the body, having difficulty in travel, which results in improved traveling performance of the tiller 10.

Obviously, various minor changes and modifications of the present invention are possible in the light of the above teaching. It is therefore to be understood that within the scope of the appended claims the invention may be practiced otherwise than as specifically described.

What is claimed is:

1. An agricultural wheel tire having a tire tread having first and second lateral edges defining the width of the tread, the tire tread comprising:
    a plurality of first lugs extending from a center of the tread width and terminating at the first lateral edge of the tire tread; and
    a plurality of second lugs extending from the center of the tread width and terminating at the second lateral edge of the tire tread;
    wherein the first and second lugs extend in an alternating manner in a circumferential direction of the tire tread so that side surfaces of adjacent first lugs and an end surface of one of the second lugs disposed between the adjacent first lugs define a first substantially arc shared contour which extends to the first lateral edge of the tire tread and which forms with a surface of the tire tread disposed between the adjacent first lugs a first substantially spherical-shaped depressed portion, and so that side surfaces of adjacent second lugs and an end surface of one of the first lugs disposed between the adjacent second lugs define a second substantially arc shaped contour which extends to the second lateral edge of the tire tread and which forms with a surface of the tire tread disposed between the adjacent second lugs a second substantially spherical-shaped depressed portion.

2. An agricultural wheel tire according to claim 1; wherein the adjacent first lugs are spaced apart, in the circumferential direction of the tire tread, from the second lug disposed therebetween; and wherein the adjacent second lugs are spaced apart, in the circumferential direction of the tire tread, from the first lug disposed therebetween.

3. An agricultural wheel tire according to claim 1; wherein the agricultural wheel tire has an equatorial centerplane crossing each of the first and second lugs in a circumferential direction of the agricultural wheel tire.

4. An agricultural wheel tire according to claim 3; wherein each of the first and second depressed portions is symmetrical about a line extending through a longitudinal center thereof and crossing the equatorial centerplane.

5. An agricultural wheel tire according to claim 1; wherein each of the first and second depressed portions is symmetrical about a line extending through a longitudinal center thereof and crossing an equatorial centerplane of the agricultural wheel tire.

6. An agricultural wheel tire according to claim 1; wherein each of the first and second lugs has a flat outer tread surface for contacting a surface of the ground during a working operation of the agricultural wheel tire.

7. A wheel tire for use on an agricultural vehicle drive wheel to be driven on soft soil, the wheel tire having a tire tread having first and second lateral edges defining the width of the tire tread, the tire tread comprising: two sets of lugs, the first set of lugs extending from a center of the tread width and terminating at the first lateral edge of the tire tread, and the second set of lugs extending from the center of the tread width and terminating at the second lateral edge of the tire tread, the first and second sets of lugs extending in an alternating manner in a circumferential direction of the tire tread so that corresponding side and end surfaces of adjacent first and second lugs define substantially arc shared contours which extend to the corresponding first and second lateral edges of the tire tread and which form with corresponding surfaces of the tire tread substantially spherical-shaped depressed portions of the tire tread, the spherical-shaped depressed portions being arranged in the circumferential direction of the tire tread so that when the wheel tire is driven on soft soil, the spherical-shaped depressed portions engage and are buried in the soft soil and the soft soil is gathered inward of the spherical-shaped depressed portions and gradually hardened so that soft soil located between and surrounding the adjacent first and second lugs increases in hardness to thereby prevent the wheel tire from sinking into the soft soil.

8. A wheel tire according to claim 7; wherein the wheel tire has an equatorial centerplane crossing each of the first and second sets of lugs in a circumferential direction of the wheel tire.

9. A wheel tire according to claim 7; wherein each of the spherical-shaped depressed portions of the tire tread is symmetrical about a line extending through a longitudinal center thereof and traversing an equatorial centerplane of the wheel tire.

\* \* \* \* \*